(12) United States Patent
Melanchenko et al.

(10) Patent No.: US 10,423,799 B2
(45) Date of Patent: Sep. 24, 2019

(54) METHODS AND APPARATUS FOR SCALABLE METRICS GATHERING FROM SECURE DATA CENTERS

(71) Applicant: salesforce.com, inc., San Francisco, CA (US)

(72) Inventors: Dmytro Melanchenko, Trinity, FL (US); Christina Martin Patrick, Tampa, FL (US); Noel Augustus Golding, Jr., Tampa, FL (US)

(73) Assignee: salesforce.com, inc., San Francisco, CA (US)

( * ) Notice: Subject to any disclaimer, the term of this patent is extended or adjusted under 35 U.S.C. 154(b) by 284 days.

(21) Appl. No.: 15/141,250

(22) Filed: Apr. 28, 2016

(65) Prior Publication Data
US 2017/0316221 A1 Nov. 2, 2017

(51) Int. Cl.
*G06F 21/62* (2013.01)
*H04L 29/06* (2006.01)
*H04L 12/26* (2006.01)

(52) U.S. Cl.
CPC ........ *G06F 21/6218* (2013.01); *H04L 63/102* (2013.01); *H04L 63/105* (2013.01); *H04L 43/0817* (2013.01); *H04L 63/0209* (2013.01)

(58) Field of Classification Search
CPC .................................................. G06F 21/6218
USPC ............................................................ 726/4
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |

(Continued)

*Primary Examiner* — Peter C Shaw
(74) *Attorney, Agent, or Firm* — Lorenz & Kopf, LLP

(57) ABSTRACT

A method for integrating a new secure datacenter into a data storage network is provided. The method detects, by an accessible datacenter connected to the data storage network, the new secure datacenter connected to the data storage network, wherein the new secure datacenter includes a high security level that prevents user access, and wherein the accessible datacenter includes a decreased security level that permits user access; expands a storage layer in the accessible datacenter, by increasing available storage hardware of the accessible datacenter; connects a data pipeline from the new secure datacenter to the storage layer in the accessible datacenter, wherein the data pipeline comprises dedicated servers configured to buffer data, orchestrate a cluster of servers, and push data from the new secure datacenter to the accessible datacenter; and provides end user access to the storage layer.

18 Claims, 7 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,528,101 B1* | 9/2013 | Miller ............... H04L 63/20 713/194 |
| 8,566,301 B2 | 10/2013 | Rueben et al. |
| 8,646,103 B2 | 2/2014 | Jakobson et al. |
| 9,338,599 B1* | 5/2016 | Burgmeier ........... H04W 4/021 |
| 9,767,197 B1* | 9/2017 | Agarwal ........... G06F 17/30864 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0086263 A1* | 4/2005 | Ngai ............... G06F 17/30306 |
| 2005/0091098 A1 | 4/2005 | Brodersen et al. |
| 2005/0131915 A1* | 6/2005 | Hicks ............... G06Q 10/10 |
| 2006/0021019 A1 | 1/2006 | Hinton et al. |
| 2008/0046434 A1* | 2/2008 | Nelson ............... G06F 21/6218 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0036581 A1* | 2/2012 | Maximilien ............ G06F 21/53 726/26 |
| 2012/0042218 A1 | 2/2012 | Cinarkaya et al. |
| 2012/0136697 A1* | 5/2012 | Peles ............... G06Q 10/0639 705/7.38 |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2017/0220605 A1* | 8/2017 | Nivala ............... G06F 16/27 |

* cited by examiner

US 10,423,799 B2

METHODS AND APPARATUS FOR SCALABLE METRICS GATHERING FROM SECURE DATA CENTERS

TECHNICAL FIELD

Embodiments of the subject matter described herein relate generally to secure datacenters. More particularly, embodiments of the subject matter relate to providing user access to data stored in a secure datacenter.

BACKGROUND

A datacenter is a facility used to house computer systems and associated components, such as telecommunications and storage systems. It generally includes multiple power supplies, data communications connections, environmental controls (e.g., air conditioning, fire suppression) and various security devices. Large datacenters may be industrial scale operations which use a large amount of electricity. A datacenter may be used to store any type of data, and various levels of security and capacity may be used for a datacenter. A data storage network may include more than one datacenter. End users may require access to data stored at a datacenter and/or metrics data associated with the stored data. However, the end user experience is usually interrupted when new storage resources are added to a datacenter, or when a new datacenter is added to a data storage network. In this scenario, the datacenter or data storage network may be required to "go offline" for a period of time while the additional storage resources are being added. In another scenario, a user may not have adequate security clearance to access a secure datacenter, but still require access to a subset of the data stored at a secure datacenter (e.g., non-secure data stored at a secure datacenter).

Accordingly, it is desirable to provide a seamless end user experience without interruptions and "offline" time, which prevents an end user from accessing his data. It is also desirable to provide a mechanism for non-secure data access. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for integrating a new secure datacenter into a data storage network. The method detects, by an accessible datacenter connected to the data storage network, the new secure datacenter connected to the data storage network, wherein the new secure datacenter includes a high security level that prevents user access, and wherein the accessible datacenter includes a decreased security level that permits user access; expands a storage layer in the accessible datacenter, by increasing available storage hardware of the accessible datacenter; connects a data pipeline from the new secure datacenter to the storage layer in the accessible datacenter, wherein the data pipeline comprises dedicated servers configured to buffer data, orchestrate a cluster of servers, and push data from the new secure datacenter to the accessible datacenter; and provides end user access to the storage layer.

Some embodiments of the present disclosure provide a data storage network system. The data storage network system includes: a plurality of secure datacenters connected to the data storage network system, each of the plurality of secure datacenters comprising at least a plurality of storage servers, and each of the plurality of secure datacenters configured to store a set of data and metrics associated with the set of data; and an accessible datacenter connected to the data storage network system, the accessible datacenter comprising at least a plurality of storage nodes, and the accessible datacenter configured to: recognize a new secure datacenter connected to the data storage network, the plurality of secure datacenters comprising the new secure datacenter; expand a storage layer in the accessible datacenter connected to the data storage network; connect a data pipeline from the new secure datacenter to the storage layer in the accessible datacenter; and provide end user access to the storage layer.

Some embodiments of the present disclosure provide an accessible datacenter connected to a data storage network. The accessible datacenter includes: at least one data pipeline, each of the at least one data pipeline connected to a respective secure datacenter and configured to receive data from each respective secure datacenter; a storage layer, configured to store the data received via the at least one data pipeline; a visualization layer, configured to provide a user interface and to receive user input requesting access to the data; and at least one processor, configured to: detect scaling of the data storage network, the scaling comprising increasing available storage of the data storage network, the increasing available storage creating increased available storage; and provide access to the increased available storage continuously, via the visualization layer, without rendering the data storage network inaccessible during scaling; wherein the data is associated with the increased available storage.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure describes methods an apparatus for increasing data storage resources in a data network, and providing uninterrupted end user access to the data network during this "scaling" of the data network. To accomplish this, an accessible datacenter is provided on the data network, wherein the accessible datacenter receives metrics data associated with the increased data storage resources. The accessible datacenter provides a user interface (e.g., a "visualization layer") for requesting particular data (e.g., the metrics data) from the increased data storage resources, and data storage (e.g., a "storage layer") for retaining the particular data.

In the context of the present disclosure, a "datacenter" may be implemented as any group of servers with as restricted direct access, e.g., a cluster, a pod, a super pod, or a datacenter. A secure datacenter stores client-specific, confidential data in combination with other types of data. A non-secure, less-secure, or "accessible" datacenter does not store client-specific or other confidential data, and is thus provided as a mechanism for a user to access non-confidential data.

Figure 1:
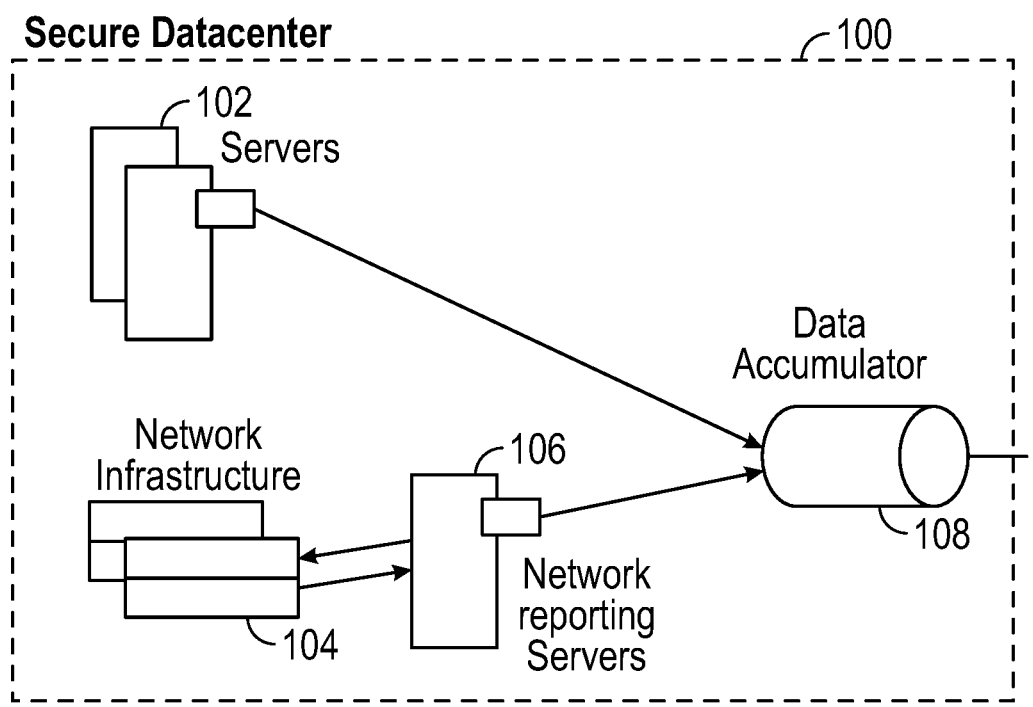
FIG. 1 is a diagram of a secure datacenter, in accordance with the disclosed embodiments.

Turning now to the figures, FIG. 1 is a diagram of a secure datacenter 100, in accordance with the disclosed embodiments. It should be appreciated that FIG. 1 depicts a simplified embodiment of the secure datacenter 100, and that some implementations of the secure datacenter 100 may include additional elements or components. The secure datacenter 100 may be implemented as a single-tier datacenter or a multi-tier datacenter. As shown, the secure datacenter 100 includes a plurality of servers 102, a network infrastructure 104, at least one network reporting server 106, and a data accumulator 108. It should be appreciated that the plurality of servers 102, the network infrastructure 104, the at least one network reporting server 106, and the data accumulator 108, and any corresponding logical elements, individually or in combination, are exemplary means for implementing a secure datacenter 100.

The plurality of servers 102 may be implemented using any number of application servers, and each server may be implemented using any suitable computer that includes at least one processor, some form of computer memory, and input/output (I/O) communication hardware and software. In some embodiments, the plurality of servers 102 includes one or more dedicated computers. In some embodiments, the plurality of servers 102 includes one or more computers carrying out other functionality, in addition to server operations.

The network infrastructure 104 is implemented using a plurality of active network devices, including but not limited to: one or more routers, firewalls, and/or switches. The active network devices are used to transmit data inside of a datacenter, as well as to serve external connections to other datacenters or end users.

The at least one network reporting server 106 is a suitable computer that includes at least one processor, some form of computer memory, and input/output (I/O) communication hardware and software, and functions to provide the metrics data from the network infrastructure to the data accumulator. The network infrastructure 104 collects data about its working conditions, i.e. volume of processed data, connected peers, temperature of its core components, and CPU and memory utilization. Collected information is stored internally and it is a responsibility of the at least one network reporting server 106 to extract the information from the network infrastructure 104 devices using a protocol supported by the network infrastructure 104 devices, and to post the data to a data accumulator 108 using a protocol supported by the data accumulator 108.

The data accumulator 108 may be implemented using a queue, a buffer, or any region of a physical memory storage used to temporarily store a set of data while the set of data is being moved from one place to another. For purposes of the present disclosure, the set of data may include metrics data obtained from the network infrastructure 104 or from servers 102. Metrics data may include information related to performance of the secure datacenter 100. Examples of metrics data may include, without limitation, system-level metrics data (disk, I/O, CPU, memory, load); application-specific metrics data (how long does a particular page take to render? how long does a particular SQL query take? how many times has a particular person logged in successfully or been unsuccessful?). Metrics data may be viewed by an end user to define baselines and/or thresholds for alerts, to view metrics trends, and system health. Metrics data includes any accessible and retrievable set of data that includes a name of a particular measurement, the time of the measurement, and the result of the measurement.

Figure 2:
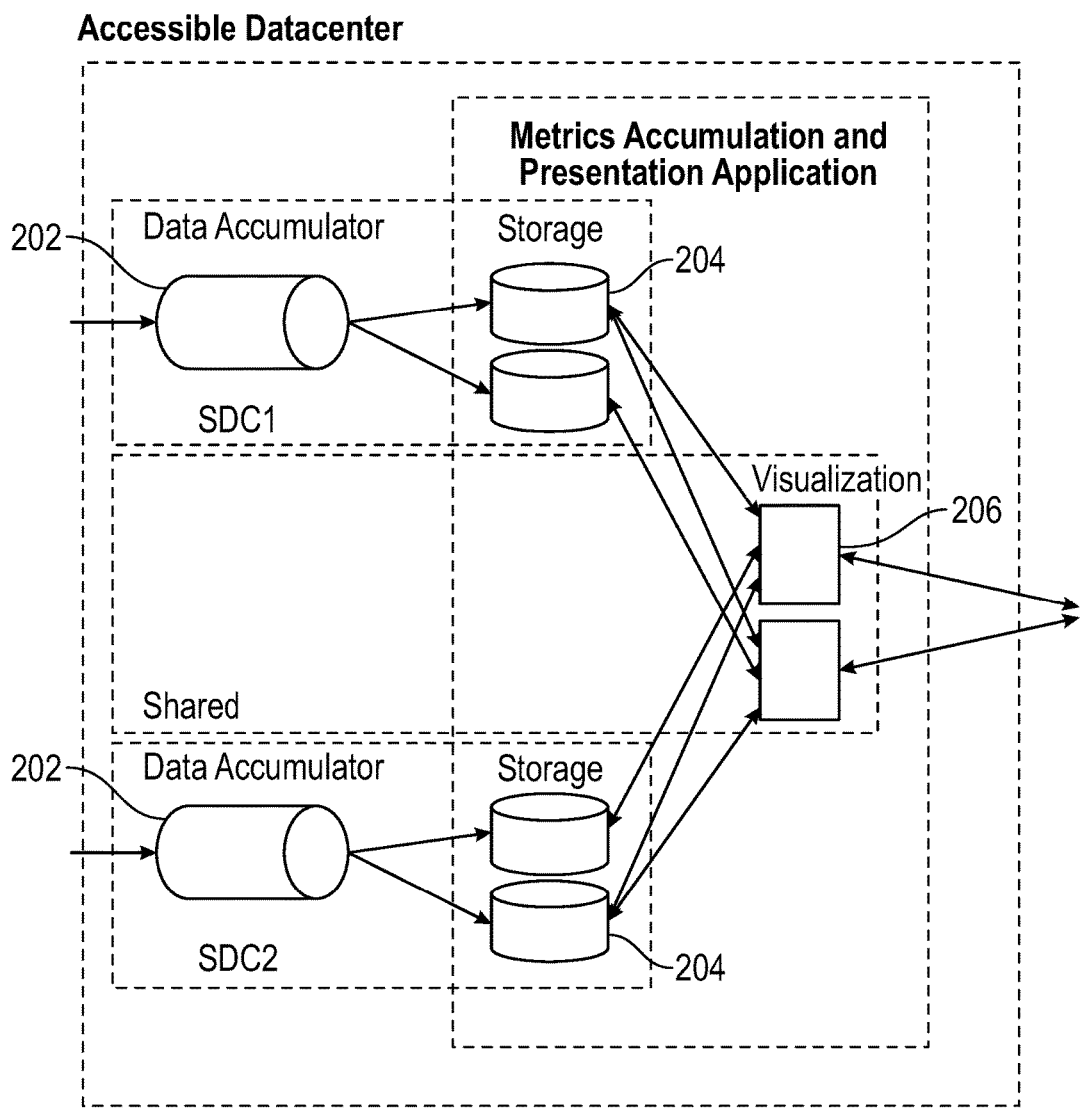
FIG. 2 is a diagram of an accessible datacenter, in accordance with the disclosed embodiments.

FIG. 2 is a diagram of an accessible datacenter 200, in accordance with the disclosed embodiments. As shown, the accessible datacenter 200 includes data accumulators 202, a plurality of storage nodes 204, and a visualization layer 206. It should be appreciated that these components and any corresponding logical elements, individually or in combination, are exemplary means for implementing an accessible datacenter 200. It should be appreciated that FIG. 2 depicts a simplified embodiment of the accessible datacenter 200, and that some implementations of the accessible datacenter 200 may include additional elements or components.

The accessible datacenter 200 includes a "storage layer" at which metrics data is stored after it is received from a secure datacenter and is available for retrieval, by a user, via a visualization layer 206. In the exemplary embodiment shown, The storage layer includes at least one data accumulator 202 associated with each secure datacenter in communication with the accessible datacenter 200, and a plurality of storage nodes 204 that are communicatively coupled to the data accumulators 202. The data accumulators 202 may be implemented as described previously with regard to FIG. 1. Each of the data accumulators 202 may be implemented using a queue, a buffer, or any region of a physical memory storage used to temporarily store a set of data while the set of data is being moved from one place to another. In this particular example, the data accumulators 202 are configured to receive data (e.g., metrics data), and then to transmit and store the received data at the plurality of storage nodes 204.

The plurality of storage nodes 204 may be implemented using one or more storage servers. Similar to the plurality of servers described previously with regard to FIG. 1, the plurality of storage nodes 204 may be implemented using any number of servers, and each server may be implemented using any suitable computer that includes at least one processor, some form of computer memory, and input/output (I/O) communication hardware and software.

The visualization layer 206 is configured for user interaction with the accessible datacenter 200. The visualization layer 206 may be configured to receive end user requests for metrics data, and to retrieve the requested data from the plurality of storage nodes 204. Thus, the visualization layer 206 provides user access to a set of requested data. The visualization layer 206 may be implemented as a computer system using at least one processor, a system memory element, and a user interface. The at least one processor may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor may be realized as one or more microprocessors, controllers, microcontrollers, or state machines. Moreover, the at least one processor may be implemented as a combination of computing devices, e.g., a combination of digital signal processors and microprocessors, a plurality of microprocessors, one or more microprocessors in conjunction with a digital signal processor core, or any other such configuration.

The at least one processor communicates with system memory. The system memory may be realized using any number of devices, components, or modules, as appropriate to the embodiment. In practice, the system memory could be realized as RAM memory, flash memory, EPROM memory, EEPROM memory, registers, a hard disk, a removable disk, or any other form of storage medium known in the art. In certain embodiments, the system memory includes a hard disk, which may also be used to support functions of the at least one processor. The system memory can be coupled to the at least one processor such that the at least one processor can read information from, and write information to, the system memory. In the alternative, the system memory may be integral to the at least one processor.

The user interface may include or cooperate with various features to allow a user to interact with the visualization layer 206 of the accessible datacenter 200. Accordingly, the user interface may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the visualization layer 206 of the accessible datacenter 200. For example, the user interface could be manipulated by an operator to make menu selections for purposes of requesting metrics data applicable to a particular datacenter that is in communication with the accessible datacenter 200. In certain embodiments, the user interface may include or cooperate with various features to allow a user to interact with the visualization layer of the accessible datacenter 200 via graphical elements rendered on a display element. Accordingly, the user interface may initiate the creation, maintenance, and presentation of a graphical user interface (GUI). In certain embodiments, the display element implements touch-sensitive technology for purposes of interacting with the GUI. Thus, a user can manipulate the GUI by moving a cursor symbol rendered on the display element, or by physically interacting with the display element itself for recognition and interpretation, via the user interface.

Using the visualization layer 206, an end user may request a set of data (e.g., a set of metrics data) that satisfies certain user-defined criteria. The user-defined criteria may be received at the visualization layer 206 via a user interface of some type (described previously). For example, an end user may provide user input requesting a set of metrics data, wherein the set of data is between a beginning date/time and ending at a particular date/time. User entered data may also include the name of a particular parameter of interest. Once the set of data has been requested, the visualization layer 206 filters the data stored at the storage nodes 204 using the user-provided criteria to identify the requested data, retrieves the data from the storage nodes, transforms it according to the user request, and then presents results to the end user in a format requested by the user (e.g., using a visual diagram or a structured data set).

Figure 3A:
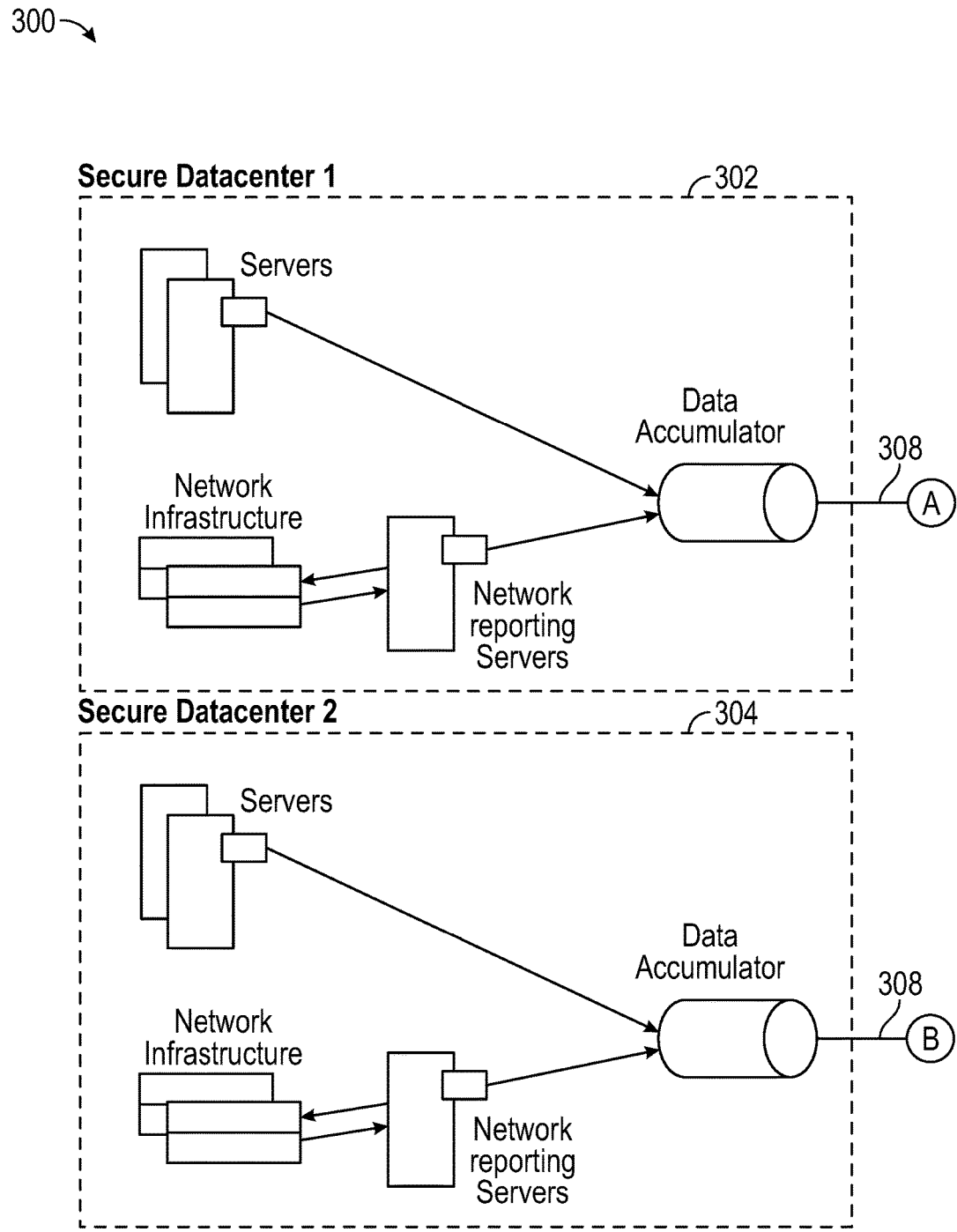
FIGS. 3A-3B illustrate a diagram of a data network, in accordance with the disclosed embodiments.
Figure 3B:
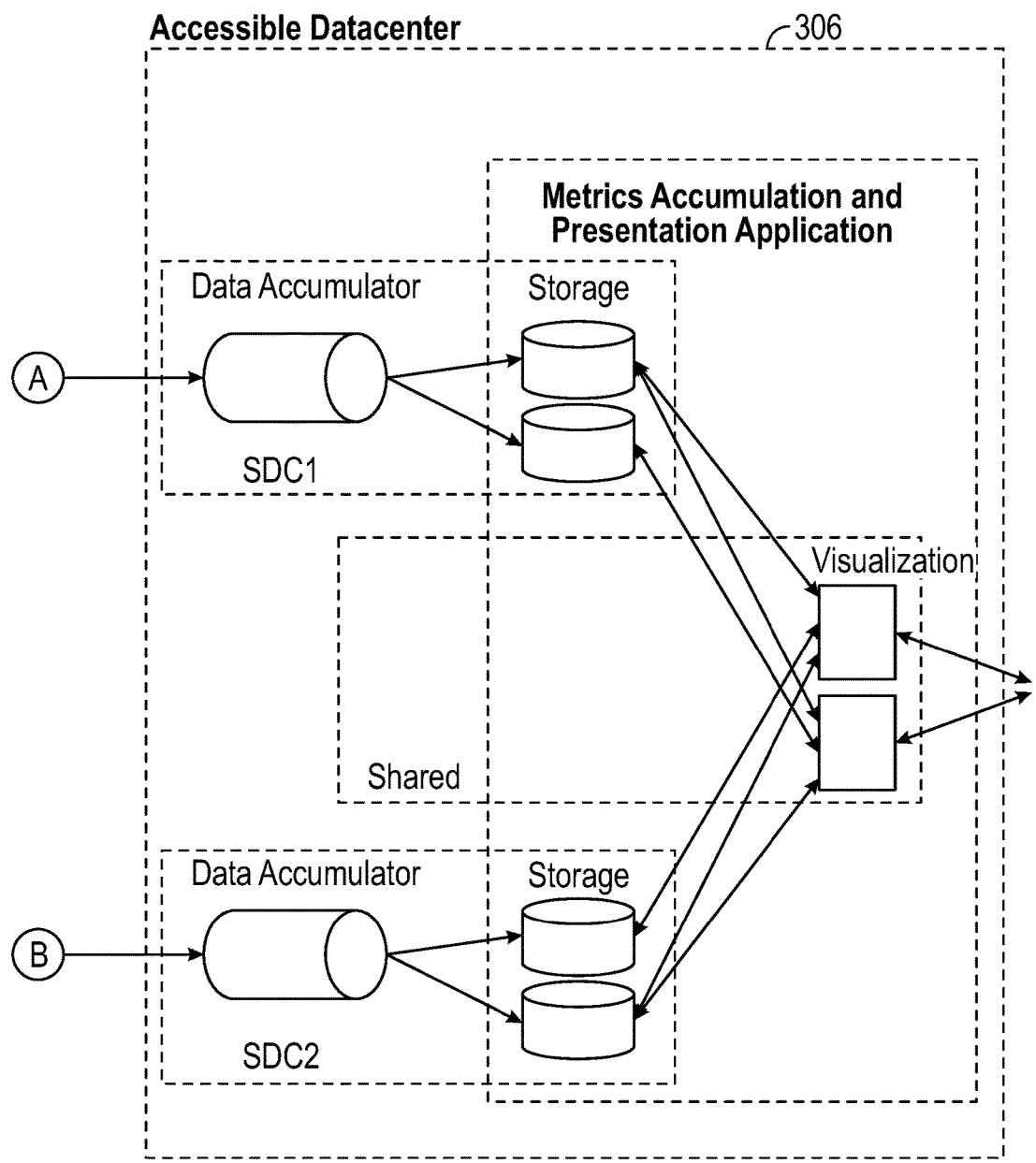

FIGS. 3A-3B illustrate a diagram of a data network 300, in accordance with the disclosed embodiments. These elements and features of the data network 300 may be operatively associated with one another, coupled to one another, or otherwise configured to cooperate with one another as needed to support the desired functionality—in particular, scalability of the data network 300, as described herein. For ease of illustration and clarity, all of the various physical, electrical, and logical couplings and interconnections for these elements and features are not depicted in FIGS. 3A-3B. Moreover, it should be appreciated that embodiments of the data network 300 will include other elements, modules, and features that cooperate to support the desired functionality. For simplicity, FIGS. 3A-3B only depict certain elements that relate to the scalability techniques described in more detail below.

In the exemplary embodiment shown, the data network 300 includes a data storage network and at least one data transmission network. Here, the data storage network includes two secure datacenters: first secure datacenter 302 and second secure datacenter 304. The data network 300 further includes an accessible datacenter 306. It should be appreciated that the data network 300 may include any number of secure datacenters (i.e., a plurality of secure datacenters), and that the accessible datacenter 306 may be communicatively coupled to any number of secure datacenters. It should further be appreciated that the first secure datacenter 302 and the second secure datacenter 304 depict simplified embodiments of secure datacenters, and that other embodiments of a secure datacenter may include additional elements or components.

Each of the first secure datacenter 302 and the second secure datacenter 304 include components consistent with the description of an exemplary embodiment of a secure datacenter described previously with regard to FIG. 1, and these components will not be redundantly described here. Further, the accessible datacenter 306 is consistent with, and includes components consistent with, the exemplary embodiment of an accessible datacenter described previously with regard to FIG. 2, and these components will not be redundantly described here.

The data network 300 further includes a plurality of data pipelines 308, which function to communicatively connect a first data accumulator of a secure datacenter (e.g., first secure datacenter 302, second secure datacenter 304) to a second data accumulator of the accessible datacenter 306. Each data pipeline represents a link between a secure datacenter 302, 304 and an accessible datacenter 306, and is an isolated data transmission network. As described previously with regard to FIG. 2, each secure datacenter includes a storage layer, which comprises at least a data accumulator and a plurality of storage nodes. Each data accumulator functions as a buffer or queue for metrics data, which is transmitted via one of the plurality of data pipelines 308 to a dedicated data accumulator of the accessible datacenter 306. The accessible datacenter 306 may include more than one data accumulator, and each data accumulator is dedicated to receive data from a particular secure datacenter. Each of the dedicated data accumulators (of the accessible datacenter 306) is further configured to transfer (i.e., transmit or "shift") received data into a plurality of storage nodes (e.g., storage servers), from which the received data is accessible by an end user via the visualization layer of the accessible datacenter 306.

Each data pipeline 308 includes dedicated servers on (1) the secure datacenter 302, 304 side, (2) on the accessible datacenter 306 side, and (3) servers potentially shared with other data pipelines. In one exemplary embodiment, one or both of the secure datacenters 302, 304 includes: five dedicated servers implemented as a data buffer (e.g., using Kafka); three dedicated servers configured to implement a cluster orchestration application (e.g., ZooKeeper); and two dedicated servers configured to "push" data from a secure datacenter 302, 304 to the accessible datacenter 306 (e.g., using Mirror Maker). In this exemplary embodiment, the accessible datacenter 306 includes: five dedicated servers implemented as a data buffer (e.g., using Kafka); and three dedicated servers configured to implement a cluster orchestration application (e.g., ZooKeeper). Also, in this exemplary embodiment, servers potentially shared with other data pipelines includes two dedicated servers implemented as consumers which "shovel" data from one or more local data buffers (e.g., those implemented using Kafka) to other storage nodes. This particular exemplary embodiment includes ten servers on the secure datacenter 302, 304 side, eight dedicated servers on the accessible datacenter 306 side, and four or more dedicated servers that are potentially shared with other data pipelines' servers on the accessible datacenter 306 side.

The purpose of the exemplary configuration of the data network 300 shown is to provide an end user, via the visualization layer of the accessible datacenter 306, access to metrics data associated with the first secure datacenter 302 and/or the second secure datacenter 304, without requiring the user to navigate the increased security protocols associated with a secure datacenter, and without making the data network 300 unavailable during integration of a new secure datacenter (e.g., without taking the data network 300 offline). The accessible datacenter 306 provides a decreased level of security, and seamless, uninterrupted end user accessibility of metrics data associated with a secure datacenter of the data network 300.

Here, the data network 300 includes two components: (1) a data storage network that includes all storage nodes of the first secure datacenter 302, the second secure datacenter 304, and the accessible datacenter 306; and (2) a data transmission network (e.g., two data accumulators and a data pipeline connection between them) for each link between a secure datacenter and the accessible datacenter 306. Each link between a secure datacenter and the accessible datacenter 306 is an isolated data transmission network. Further, the data storage network is divided into isolated sub-networks, and each of the sub-networks is connected with one or more data transmission networks.

Figure 4:
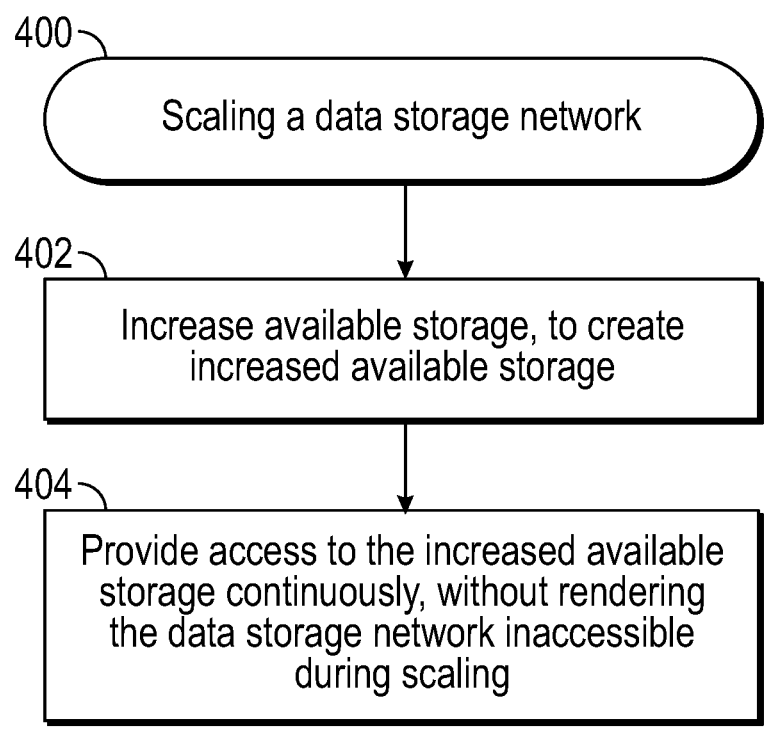
FIG. 4 is an embodiment of a process for scaling a data storage network.

FIG. 4 is an embodiment of a process 400 for scaling a data storage network. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

First, the process 400 increases available storage in the data storage network, to create increased available storage (step 402). Increased available storage may include an additional storage either to store metrics data from a new datacenter or from one of earlier connected datacenters. For example, increased available storage may include, without limitation, servers and/or any other system memory element applicable to a datacenter and/or compatible with data communication in the data storage network. Here, the process 400 incorporates additional storage resources into the data storage network by creating a communication connection between the additional storage resources and the data storage network. This process also includes: (i) reconfiguration of a visualization layer by adding references to new elements of the data storage network, so that the visualization layer can forward users' requests to these new elements of the data storage network; (ii) reconfiguration of one or more data accumulators in the accessible datacenter by adding references to the new elements of the data storage network, so these data accumulators can offload accumulated data to the new elements of the data storage network; and (iii) reconfiguration of existing elements of the data storage network, so that the existing elements can establish connections to the new elements of the data storage network.

Next, the process 400 provides access to the increased available storage continuously, without rendering the data storage network inaccessible during scaling (step 404). Generally, the integration of additional storage resources requires a period of "offline" time, during which additional memory resources (e.g., a new datacenter, new servers, other memory hardware) are integrated into the data storage network. Here, the process 400 makes data stored at the increased available storage (i.e., the additional storage resources) available to a user, without taking the data storage network offline for any period of time.

Figure 5:
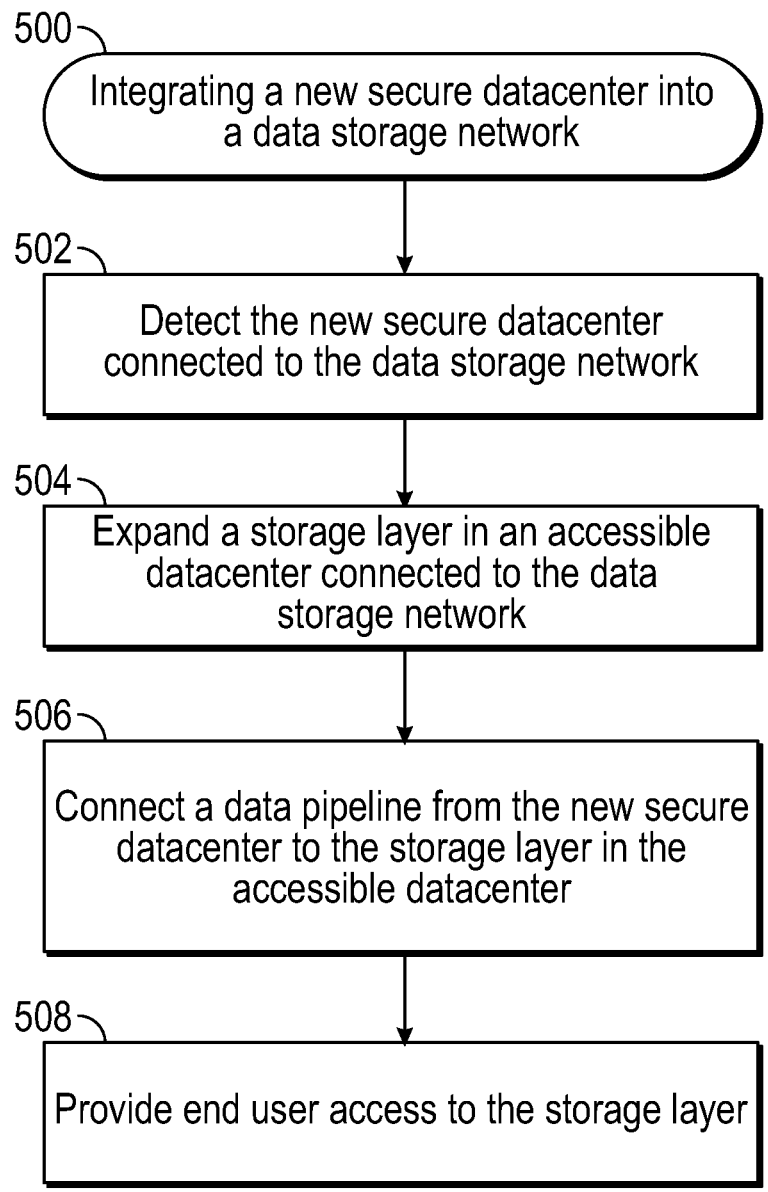
FIG. 5 is an embodiment of a process for integrating a new secure datacenter into a data storage network.

FIG. 5 is an embodiment of a process 500 for integrating a new secure datacenter into a data storage network. For ease of description and clarity, it is assumed that the process 500 begins by detecting a new datacenter connected to the data storage network (step 502). Integration of a new secure data center with the data storage network is a part of a process to build out new data centers. The integration is scheduled by a project plan and must be completed before the data center is available for general use.

Next, the process 500 expands a storage layer in an accessible datacenter connected to the data storage network, by incorporating additional storage resources (step 504), such as additional storage servers, thereby increasing the storage capacity of the accessible datacenter. Here, the process 500 incorporates a data accumulator into an accessible datacenter, wherein the data accumulator is configured to act as a queue or buffer and receive metrics data from the new datacenter. Data storage layer expansion includes adding new servers to the accessible data center, initial setup of the new servers so they can act as data storage "nodes" (i.e., data storage servers). The data storage network is divided into sub-networks, which are isolated from each other. In situations where the new storage servers are intended for addition and use in one of the existing sub-networks (to expand the data storage capacity of the existing sub-network), then other servers in the sub-network are also reconfigured by adding references to the new storage servers.

After expanding the storage layer in the accessible datacenter (step 504), the process 500 connects a data pipeline from the new secure datacenter to the storage layer (step 506). Here, the process 500 provides a mechanism for communication from the new secure datacenter to the accessible datacenter. Exemplary embodiments of the process 500 may implement this communication mechanism using any compatible data transmission system, such as Apache Kafka, Rabbit MQ, HTTP REST end-point, or the like.

In certain embodiments, the process 500 identifies a first data accumulator associated with the new secure datacenter, and then connects the data pipeline from the first data accumulator to a second data accumulator associated with an accessible datacenter, as shown in FIGS. 3A-3B. The data accumulator may be implemented using a queue, a buffer, or any region of a physical memory storage used to temporarily store a set of data while the set of data is being moved from one place to another, as described previously with regard to FIG. 1. Here, the process 500 may receive metrics data at the second data accumulator, via the connected data pipeline, and shift the received data to one or more of a plurality of storage nodes which are accessible to an end user.

After connecting the data pipeline (step 506), the process 500 provides end user access to the storage layer (step 508). One suitable methodology for providing end user access to the storage layer is described below with reference to FIG. 6. The storage layer may include a data accumulator in an accessible datacenter, as shown in FIGS. 2-3. The storage layer may also include a plurality of storage nodes, servers, and/or any other compatible form of storage. The process 500 provides end user access such that a user may request, retrieve, or otherwise access metrics data transmitted from the new secure datacenter, and which is currently available at the accessible datacenter.

In certain embodiments, the end user access is provided via a visualization layer, as shown and described above with regard to FIGS. 2-3. The visualization layer is generally implemented as a user interface configured to receive user requests for particular data and to display the requested data when retrieved. Here, the process 500 may receive user-entered parameters defining a set of data that an end user has requested, filter all data stored in a particular storage node of an accessible datacenter to identify the requested data, and present the requested data. User-entered data may include a time period that includes the requested metrics data, and a name or identifier for the requested metrics data. Visualization layer includes one or more servers working together to process requests from many users in parallel. Each of the servers can process multiple requests at the same time. Processing a user request generally includes: receiving a request from an end user over a communication network, analyzing the request, extracting filters provided by the users to identify metrics the user requested, identifying servers where metrics satisfying the filters are stored, requesting metrics data from the identified storage servers, performing calculations and transformations on the metrics data if such was requested by the user, representing the result metrics data in a format requested by the user, and sending the result back to the user over a communication network. The visualization layer is also responsible for processing user requests for any elements of the visual user interface. For example, servers of the visualization layer receive requests from a user for components that implement elements of a visual user interface, find such components in a physical memory attached to the servers, and post the components back the user over a communication network.

Figure 6:
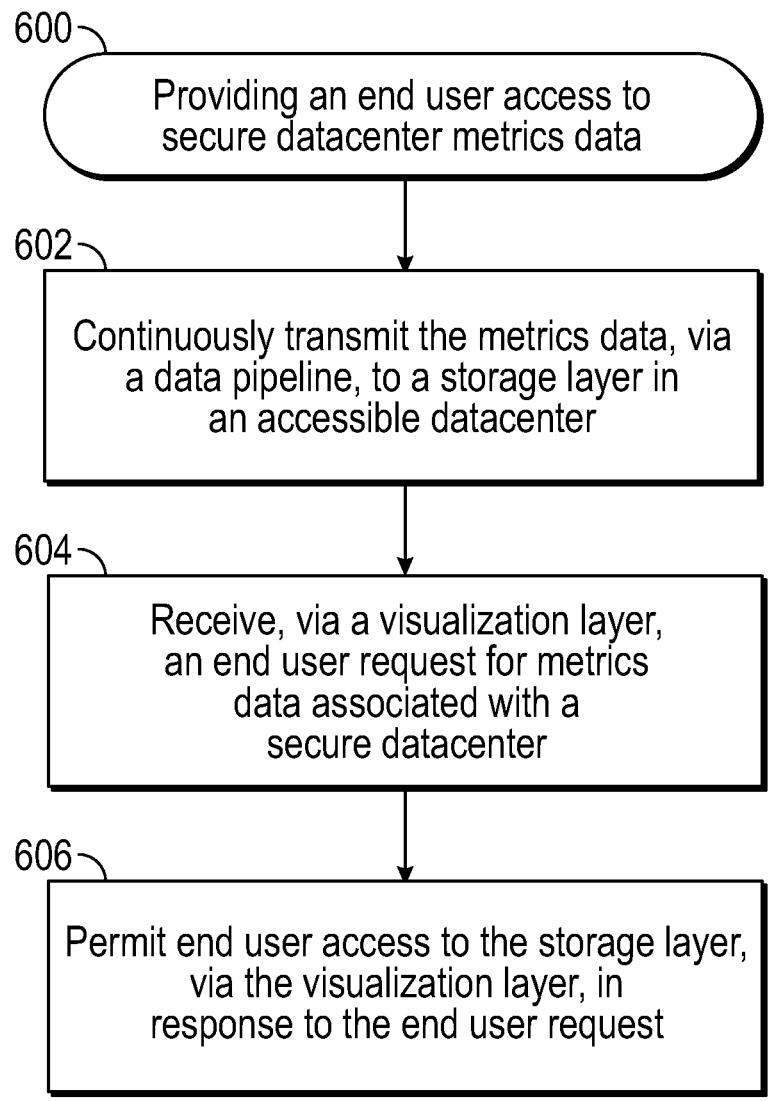
FIG. 6 is an embodiment of a process for providing an end user access to secure datacenter metrics data.

FIG. 6 is an embodiment of a process 600 for providing an end user access to secure datacenter metrics data. It should be appreciated that the process 600 described in FIG. 6 represents one embodiment of step 508 described above in the discussion of FIG. 5, including additional detail. First, the process 600 continuously transmits the metrics data, via a data pipeline, to a storage layer of the accessible datacenter (step 602). In this step, the process 600 shifts the metrics data from a high-security location to a low-security location, enabling an end user to access the metrics data without delay during integration of the secure datacenter into a data storage network. In certain embodiments, the process 600 may transmit the metrics data from a first data accumulator associated with the secure datacenter to a second data accumulator associated with the accessible datacenter (as described previously with regard to FIGS. 1-3). In this particular embodiment, the process 600 may shift the metrics data out of the second data accumulator, which acts as a buffer or queue, into one of a plurality of storage nodes of the storage layer of the accessible datacenter. In other embodiments, the process 600 may transfer the metrics data from any secure data storage location associated with the secure datacenter to any less-secure data storage location associated with the accessible datacenter.

Next, the process 600 receives, via a visualization layer of an accessible datacenter, an end user request for metrics data associated with a secure datacenter (step 604). In certain embodiments, during step 604, the secure datacenter may be integrated into the same data storage network as the accessible datacenter. In some embodiments, however, step 604 is performed while the secure datacenter is in the process of being integrated into the same data storage network as the accessible datacenter. The requested metrics data may include information related to performance of the secure datacenter, as described previously with regard to FIG. 1. The process 600 then permits end user access to the storage layer, via the visualization layer (step 606), which is described previously with regard to FIGS. 2-3. Here, the process 600 provides the end user access to data that continuously flows from secure datacenter(s) to the accessible datacenter. This data is transmitted constantly, without regard for user requests that may be received or not received. Thus, the user is granted access to data that has already been transmitted to the accessible datacenter.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for integrating a new secure datacenter into a data storage network comprising a plurality of datacenters, the method comprising:

detecting the new secure datacenter connected to the data storage network, by an accessible datacenter connected to the data storage network, wherein the new secure datacenter comprises at least a plurality of servers, network infrastructure, and at least one network reporting server configured to provide metrics data from the network infrastructure, wherein the metrics data comprises at least system-level metrics associated with performance of the secure datacenter, wherein the new secure datacenter comprises a high-security facility that includes a high security level that prevents user access, and wherein the accessible datacenter comprises a low-security facility that includes a decreased security level that permits user access;

expanding a storage layer in the accessible datacenter, by creating communication connections between additional storage resources and the data storage network to increase available storage hardware of the accessible datacenter, wherein the additional storage resources include storage servers configured to store the metrics data received from the new secure datacenter via a data pipeline for communication from the new secure datacenter to the accessible datacenter;

connecting the data pipeline from the new secure datacenter to the storage layer in the accessible datacenter, wherein the data pipeline comprises a communication mechanism including dedicated servers configured to buffer data, orchestrate a cluster of servers, and push the metrics data from the new secure datacenter to the accessible datacenter; and providing end user access to the metrics data stored by the storage layer, by:

pushing the metrics data from the high-security facility to the low-security facility that permits user access, by transmitting the metrics data for the new secure datacenter via the data pipeline to the storage layer in the accessible datacenter;

receiving an end user request for a set of the metrics data associated with the secure datacenter, by a visualization layer comprising a computer system configured for user interaction with the accessible datacenter; and permitting end user access to the storage layer of the accessible datacenter, in response to the end user request, by the visualization layer.

2. The method of claim 1, wherein connecting the data pipeline further comprises:

identifying a first data accumulator associated with the new secure datacenter; and connecting the data pipeline from the first data accumulator to a second data accumulator at the accessible datacenter, wherein the storage layer comprises the second data accumulator.

3. The method of claim 2, further comprising:
after connecting the data pipeline,
  transferring a set of data from the first data accumulator to the second data accumulator;
  shifting the set of data to a plurality of storage nodes, wherein the accessible datacenter comprises the plurality of storage nodes; and
  providing the end user access to the set of data stored in the plurality of storage nodes.

4. The method of claim 3, further comprising:
providing the end user access to the plurality of storage nodes via the visualization layer;
wherein the visualization layer comprises a user interface in communication with the plurality of storage nodes.

5. The method of claim 1, further comprising:
scaling the data storage network by increasing available storage, to create increased available storage; and
providing access to the increased available storage continuously, without rendering the data storage network inaccessible during scaling;
wherein the increased available storage comprises the new secure datacenter.

6. The method of claim 1, further comprising:
continuously transmitting the metrics data from a first data accumulator of the new secure datacenter to a second data accumulator of the accessible datacenter, wherein the storage layer comprises the second data accumulator;
receiving the end user request via a visualization layer comprising a user interface in communication with the storage layer; and
providing end user access to the storage layer, in response to the end user request.

7. A data storage network system, comprising:
a plurality of secure datacenters connected to the data storage network system, each of the plurality of secure datacenters comprising at least a plurality of storage servers, and each of the plurality of secure datacenters configured to store a set of data and metrics associated with the set of data; and
an accessible datacenter connected to the data storage network system, the accessible datacenter comprising at least a plurality of storage nodes, and the accessible datacenter comprises a low-security facility that includes a decreased security level that permits user access, the accessible datacenter configured to:
  detect a new secure datacenter connected to the data storage network, the plurality of secure datacenters comprising the new secure datacenter, wherein the new secure datacenter comprises at least a plurality of servers, network infrastructure, and at least one network reporting server configured to provide metrics data from the network infrastructure, and wherein the metrics data comprises at least system-level metrics associated with performance of the secure datacenter, wherein the new secure datacenter comprises a high-security facility that includes a high security level that prevents user access;
  expand a storage layer in the accessible datacenter connected to the data storage network, by creating communication connections between additional storage resources and the data storage network to increase available storage hardware of the accessible datacenter, wherein the additional storage resources include storage servers configured to store the metrics data received from the new secure datacenter via a data pipeline for communication from the new secure datacenter to the accessible datacenter;
  connect the data pipeline from the new secure datacenter to the storage layer in the accessible datacenter, wherein the data pipeline comprises a communication mechanism including dedicated servers configured to buffer data, orchestrate a cluster of servers, and push the metrics data from the new secure datacenter to the accessible datacenter; and
  provide end user access to the metrics data stored by the storage layer, by:
    pushing the metrics data from the high-security facility to the low-security facility that permits user access, by transmitting the metrics data for the new secure datacenter via the data pipeline to the storage layer in the accessible datacenter;
    receiving an end user request for a set of the metrics data associated with the secure datacenter, by a visualization layer comprising a computer system configured for user interaction with the accessible datacenter; and
    permitting end user access to the storage layer of the accessible datacenter, in response to the end user request, by the visualization layer.

8. The data storage network system of claim 7, wherein the accessible datacenter is configured to connect the data pipeline by:
identifying a first data accumulator associated with the new secure datacenter; and
connecting the data pipeline from the first data accumulator to a second data accumulator at the accessible datacenter, wherein the storage layer comprises the second data accumulator.

9. The data storage network system of claim 8, wherein, after connecting the data pipeline, the accessible datacenter is further configured to:
transfer a set of data from the first data accumulator to the second data accumulator;
shift the set of data to a plurality of storage nodes, wherein the accessible datacenter comprises the plurality of storage nodes; and
provide the end user access to the set of data stored in the plurality of storage nodes.

10. The data storage network system of claim 9, wherein the accessible datacenter is further configured to provide the end user access to the plurality of storage nodes via a visualization layer, wherein the visualization layer comprises a user interface in communication with the plurality of storage nodes.

11. The data storage network system of claim 7, wherein the accessible datacenter is further configured to:
scale the data storage network by increasing available storage, to create increased available storage; and
provide access to the increased available storage continuously, without rendering the data storage network inaccessible during scaling;
wherein the increased available storage comprises the new secure datacenter.

12. The data storage network system of claim 7, wherein the accessible datacenter is further configured to provide the end user access to the storage layer by:
continuously transmitting the metrics data via the data pipeline to the storage layer in the accessible datacenter;

receiving the end user request for the metrics data associated with the new secure datacenter; and in response to the end user request, providing end user access to the storage layer.

13. An accessible datacenter connected to a data storage network comprising a plurality of datacenters, the accessible datacenter comprising:

a data pipeline connected to a new secure datacenter and configured to receive data from the new secure datacenter;

a storage layer, configured to store the data received via the data pipeline;

a visualization layer, configured to provide a user interface and to receive user input requesting access to the data; and at least one processor, configured to:
detect the new secure datacenter connected to the data storage network, wherein the new secure datacenter comprises at least a plurality of servers, network infrastructure, and at least one network reporting server configured to provide metrics data from the network infrastructure, wherein the metrics data comprises at least system-level metrics associated with performance of the new secure datacenter, wherein the new secure datacenter comprises a high-security facility that includes a high security level that prevents user access, and wherein the accessible datacenter comprises a low-security facility that includes a decreased security level that permits user access;

expand the storage layer, by creating communication connections between additional storage resources and the data storage network to increase available storage hardware of the accessible datacenter, wherein the additional storage resources include storage servers configured to store the metrics data received from the new secure datacenter via the data pipeline for communication from the new secure datacenter to the accessible datacenter;

connect the data pipeline from the new secure datacenter to the storage layer in the accessible datacenter, wherein the data pipeline comprises a communication mechanism including dedicated servers configured to buffer data, orchestrate a cluster of servers, and push the metrics data from the new secure datacenter to the accessible datacenter; and providing end user access to the metrics data stored by the storage layer, by:
receiving the metrics data pushed from the high-security facility to the low-security facility that permits user access, via the data pipeline to the storage layer;

receiving an end user request for a set of the metrics data associated with the secure datacenter, via the visualization layer; and permitting end user access to the storage layer, in response to the end user request, via the visualization layer.

14. The accessible datacenter of claim 13, wherein the at least one processor is further configured to connect the data pipeline, by:
identifying a first data accumulator associated with the new secure datacenter; and
connecting the data pipeline from the first data accumulator to a second data accumulator of the accessible datacenter, wherein the storage layer comprises the second data accumulator.

15. The accessible datacenter of claim 14, wherein the at least one processor is further configured to:
after connecting the data pipeline,
transfer a set of data from the first data accumulator to the second data accumulator;
shift the set of data to a plurality of storage nodes, wherein the storage layer of the accessible datacenter comprises the plurality of storage nodes; and
provide the end user access to the set of data stored in the plurality of storage nodes.

16. The accessible datacenter of claim 15, wherein the at least one processor is further configured to:
provide the end user access to the plurality of storage nodes via the visualization layer;
wherein the visualization layer comprises the user interface in communication with the plurality of storage nodes.

17. The accessible datacenter of claim 13, wherein the at least one processor is further configured to:
scale the data storage network by increasing the available storage, to create increased available storage; and
provide access to the increased available storage continuously, without rendering the data storage network inaccessible during scaling;
wherein the increased available storage comprises the new secure datacenter.

18. The accessible datacenter of claim 13, wherein the at least one processor is further configured to:
continuously receive the metrics data from a first data accumulator of the new secure datacenter to a second data accumulator of the accessible datacenter, wherein the storage layer comprises the second data accumulator;
receive the end user request via the visualization layer comprising the user interface in communication with the storage layer; and
provide the end user access to the storage layer, in response to the end user request.

* * * * *